United States Patent
Kim

(10) Patent No.: US 9,252,401 B2
(45) Date of Patent: Feb. 2, 2016

(54) SECONDARY BATTERY

(75) Inventor: Dukjung Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 409 days.

(21) Appl. No.: 13/292,646

(22) Filed: Nov. 9, 2011

(65) Prior Publication Data

US 2012/0225348 A1 Sep. 6, 2012

(30) Foreign Application Priority Data

Mar. 4, 2011 (KR) .................. 10-2011-0019397

(51) Int. Cl.
| | |
|---|---|
| *H01M 2/06* | (2006.01) |
| *H01M 2/08* | (2006.01) |
| *H01M 2/02* | (2006.01) |
| *H01M 2/04* | (2006.01) |
| *H01M 2/26* | (2006.01) |
| *H01M 2/30* | (2006.01) |

(52) U.S. Cl.
CPC ............ *H01M 2/024* (2013.01); *H01M 2/0434* (2013.01); *H01M 2/266* (2013.01); *H01M 2/307* (2013.01); *H01M 2/021* (2013.01); *H01M 2/26* (2013.01); *H01M 2/30* (2013.01)

(58) Field of Classification Search
None
See application file for complete search history.

(56) References Cited

U.S. PATENT DOCUMENTS

| | | | | |
|---|---|---|---|---|
| 2005/0260491 | A1* | 11/2005 | Cho ............................. | 429/178 |
| 2010/0047686 | A1* | 2/2010 | Tsuchiya et al. .............. | 429/178 |
| 2010/0143786 | A1* | 6/2010 | Kim ............................. | 429/158 |
| 2010/0173190 | A1* | 7/2010 | Tsuchiya ..................... | 429/160 |
| 2010/0310913 | A1 | 12/2010 | Kim et al. | |

FOREIGN PATENT DOCUMENTS

| | | |
|---|---|---|
| EP | 0 769 820 A1 | 4/1997 |
| EP | 20487 735 A2 | 8/2012 |
| JP | 2011-329447 A | 11/1999 |
| JP | 2003-092103 | 3/2003 |
| JP | 2009-87722 A | 4/2009 |
| JP | 2009-105075 | 5/2009 |
| JP | 2009-252393 A | 10/2009 |

OTHER PUBLICATIONS

Korean Notice of Allowance dated May 30, 2013.
Extended European Search Report dated Nov. 25, 2013.

* cited by examiner

*Primary Examiner* — Ula C Ruddock
*Assistant Examiner* — Matthew Van Oudenaren
(74) *Attorney, Agent, or Firm* — Lee & Morse, P.C.

(57) ABSTRACT

A secondary battery may include a secondary battery, including, a case having an upper opening and an internal cavity, an electrode assembly disposed within the internal cavity of the case, a cap plate coupled to the case and sealing the upper opening, a collector plate coupled to the electrode assembly, a collector terminal coupled to the collector plate, the collector terminal including a rivet portion and terminal portion above a top surface of the cap plate, and a terminal plate positioned above the cap plate and coupled to the rivet portion of the collector terminal.

16 Claims, 5 Drawing Sheets

SECONDARY BATTERY

BACKGROUND

1. Field

Embodiments relate to a secondary battery.

2. Description of the Related Art

Unlike primary batteries, which cannot be recharged, secondary batteries can be repeatedly charged and discharged. Low capacity secondary batteries that use single battery cells may be used as power sources for various portable electronic devices, such as cellular phones and camcorders. High capacity secondary batteries that use tens of battery cells connected to each other in a battery pack may be used as power sources for driving motors, such as in electric scooters, or hybrid electric vehicles (HEV).

Secondary batteries may be classified into different types, for example, cylindrical and prismatic types. A unit battery includes an electrode assembly having positive and negative electrodes and a separator interposed between the positive and negative electrodes, a case for receiving the electrode assembly, and a cap assembly for sealing the case. Positive and negative electrode terminals are electrically connected to the electrode assembly and outwardly protrude and extend through the cap plate.

SUMMARY

According to an embodiment, a secondary battery may include a case having an upper opening and an internal cavity, an electrode assembly disposed within the internal cavity of the case, a cap plate coupled to the case and sealing the upper opening, a collector plate coupled to the electrode assembly, a collector terminal coupled to the collector plate, the collector terminal including a rivet portion and a terminal portion above a top surface of the cap plate, and a terminal plate positioned above the cap plate and coupled to the rivet portion of the collector terminal.

The rivet portion may include a deformable peripheral wall that is adjustable from an upright position to an expanded position, the deformable wall being spaced from a sloping surface of the terminal plate in the upright position, and the deformable wall contacting the sloping surface in the expanded position. An outer surface of the terminal portion may include a thread.

The secondary battery may further include a connecting portion at a boundary between the rivet portion of the collector terminal and the terminal plate. The connecting portion may include a juncture between an upper edge of the peripheral wall of the rivet portion and the sloping surface of the terminal plate. The upper edge of the peripheral wall may be directly connected to the sloping surface of the terminal plate.

The rivet portion of the collector terminal may include a first region of the collector terminal protruding upward from the terminal plate, the first region being radially folded toward the terminal plate. The rivet portion of the collector terminal may be integral with the collector terminal and have a funnel shape when adjusted to the expanded position. An upper diameter of the collector terminal may be smaller than a lower diameter of the collector terminal when the rivet portion is in the upright position.

The terminal plate may include a sloping surface, the sloping surface may extend below a horizontal top surface of the terminal plate.

The sloping surface may be configured to support the rivet portion when the rivet portion is in an expanded position.

The rivet portion of the collector terminal may be directly connected to the sloping surface of the terminal plate.

The secondary battery may further include a first insulation member between the top portion of the cap plate and the terminal plate.

The secondary battery may further include a second insulation member between a bottom portion of the cap plate and the collector terminal.

The secondary battery may further include a seal gasket around a throughhole of the cap plate through which the collector terminal extends. The collector terminal may include a flange extending parallel to the cap plate. The rivet portion may be between the terminal plate and the terminal portion. The rivet portion may surround the terminal portion and overlap the terminal plate. The rivet portion may extend at an oblique angle from the terminal portion to contact the sloping surface.

Additional aspects and/or advantages of the invention will be set forth in part in the description which follows and, in part, will be obvious from the description, or may be learned by practice of the embodiments.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
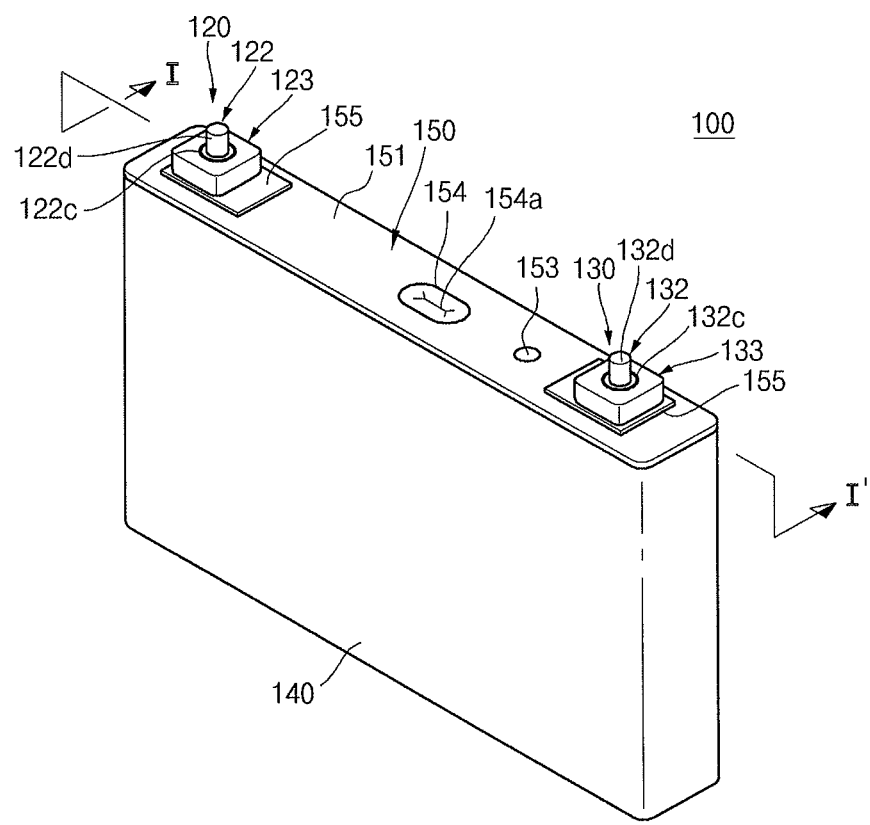
FIG. 1 illustrates a perspective view of a secondary battery according to an embodiment.

Korean Patent Application No. 10-2011-0019397, filed on Mar. 4, 2011, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

First, a configuration of a secondary battery according to an embodiment will be described.

Figure 2:
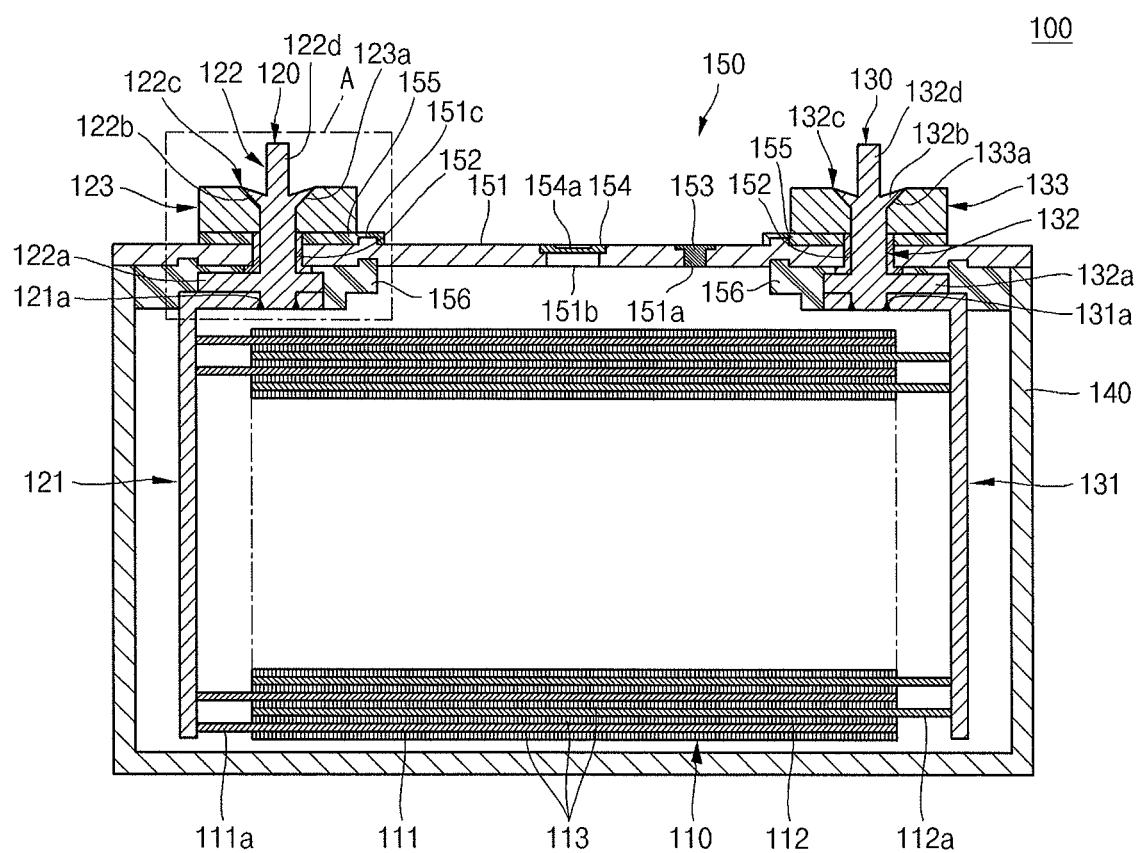
FIG. 2 illustrates a cross-sectional view taken along the line I-I' of FIG. 1.
Figure 3:
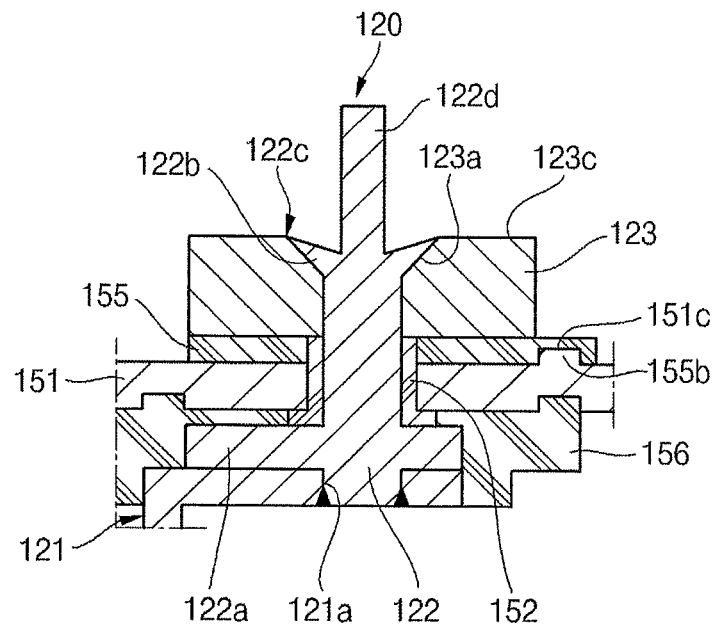
FIG. 3 illustrates an enlarged view of a portion 'A' of FIG. 2.

FIG. 1 illustrates a perspective view of a secondary battery according to an embodiment, FIG. 2 illustrates a cross-sectional view taken along the line I-I' of FIG. 1, and FIG. 3 illustrates an enlarged view of a portion 'A' of FIG. 2.

Referring to FIGS. 1-3, a secondary battery 100 according to an embodiment may include an electrode assembly 110, a first terminal 120, a second terminal 130, a case 140, and a cap assembly 150.

The electrode assembly 110 is formed by winding or stacking a first electrode plate 111, a separator 113, and a second electrode plate 112, which are formed of a thin plate or layer. Here, the first electrode plate 111 may operate as a negative electrode and the second electrode plate 112 may operate as a positive electrode, or vice versa.

The first electrode plate 111 may be formed by coating or disposing a first electrode active material on a first electrode collector. The first electrode active material may be formed of graphite, carbon, or other suitable material. The first electrode collector may be formed of a metal foil made of, for example, copper or nickel. The first electrode collector may include a first electrode uncoated region 111a that is a region not coated with a first electrode active material. The first electrode uncoated region 111a may be formed at a first end of the first electrode plate 111. The first electrode uncoated region 111a may become a path of flow of current between the first electrode plate 111 and outside thereof, e.g., exterior of the battery. It should be understood that the material from which the first electrode plate 111 may be formed is not limited to the materials specifically described herein.

The second electrode plate 112 may be formed by coating or disposing a second electrode active material, such as a transition metal oxide, on a second electrode collector. The second electrode collector may be formed of a metal foil made of aluminum, for example, and may include a second electrode uncoated region 112a that is a region not coated with a second electrode active material. The second electrode uncoated region 112a may be formed at a second end of the second electrode plate 112, opposite the first end of the first electrode plate 111. The second electrode uncoated region 112a may become a path of flow of current between the second electrode plate 112 and outside thereof. It should be understood that the material from which the second electrode plate 112 may be formed is not limited to the materials specifically described herein.

The first and second electrode plates 111 and 112 may have different polarities.

The separator 113 may be interposed between the first electrode plate 111 and the second electrode plate 112 for preventing a short-circuit therebetween and allowing for movement of lithium ions. For example, the separator 113 may be formed of polyethylene (PE), polypropylene (PP), or a composite film of PE and PP. It should be understood that the material from which the separator 113 may be formed is not limited to the materials specifically described herein.

The first terminal 120 and the second terminal 130 may be electrically connected to the first electrode plate 111 and the second electrode plate 112, respectively, at opposing ends of the electrode assembly 110.

The electrode assembly 110 may be accommodated or retained in the case 140 with an electrolyte. The electrolyte may include an organic solvent such as, ethylene carbonate (EC), propylene carbonate (PC), diethyl carbonate (DEC), ethyl methyl carbonate (EMC) or dimethyl carbonate (DMC), and a lithium salt such as, $LiPF_6$ or $LiBF_4$. In addition, the electrolyte may be a liquid, solid, and/or gel electrolyte.

The first terminal 120 may generally be made of metal or equivalents thereof, and may be electrically connected to the first electrode plate 111. The first terminal 120 may include a first collector plate 121, a first collector terminal 122, and a first terminal plate 123.

The first collector plate 121 may contact the first electrode uncoated region 111a protruding toward one end of the electrode assembly 110. According to an embodiment, the first collector plate 121 may be welded to the first electrode uncoated region 111a. The first collector plate 121 may be substantially formed in an 'inverted L (⌐)' shape, and may have a terminal hole 121a formed at its upper portion. The first collector terminal 122 may be inserted into and engaged with the terminal hole 121a. For example, an end portion of the first collector terminal 122 may be secured within the terminal hole 121a. The first collector plate 121 may be made of copper, a copper alloy, or a combination thereof. It should be understood that the material from which the first collector plate 121 may be formed is not limited to the materials specifically described herein.

The first collector terminal 122 may protrude upwardly and may include a first portion that extends above a top surface of the cap plate 151 by a predetermined length. The first collector terminal 122 may extend through the cap plate 151, and may be electrically connected to the first collector plate 121 under the cap plate 151. The first collector terminal 122 may include a thread 122f at the first portion of the first collector terminal 122 that extends above a top surface of the cap plate 151 to facilitate bolt engagement with a bus bar when connecting batteries in series/parallel.

As described above, the first portion of the first collector terminal 122 may protrude upwardly and extend above a top surface of the cap plate 151 by a predetermined length. A second portion of the first collector terminal 122 may extend below a top surface of the cap plate 151 and include a laterally extending flange 122a formed under the cap plate 151. The laterally extending flange 122a may prevent the first collector terminal 122 from being dislodged from the cap plate 151. A region or end portion of the first collector terminal 122 formed under or extending below the flange 122a may be fitted into the terminal hole 121a of the first collector plate 121 to be welded.

In addition, a rivet portion 122b of the first collector terminal 122 may be formed in the first portion of the first collector terminal 122, i.e., above the flange 122a. The rivet portion 122b may be between the flange 122a and a terminal portion 122d, and may be affixed to the first terminal plate 123. That is to say, the rivet portion 122b formed at or near a top end of the first collector terminal 122 may extend away, e.g., at an oblique angle, from the terminal portion 122d to engage the first terminal plate 123. For example, the rivet portion 122b may have a deformable peripheral wall 122e surrounding the terminal portion 122d and having an upper edge 122g (see FIG. 4). The deformable peripheral wall 122e may be deformed or adjusted from an upright position to an expanded position. For example, the deformable peripheral wall 122e may be cylindrical in the upright position and funnel-shaped in the expanded position (see FIGS. 6-7). Here, the peripheral wall 122e of the rivet portion 122b may be riveted, expanded, folded, or otherwise adjusted toward the first terminal plate 123, such that the peripheral wall 122e abuts, e.g., contacts and overlaps at least a portion of a sloping surface 123a, i.e., a contact surface, of the first terminal plate 123. The rivet portion 122b may, in this manner, increase coupling efficiency or further secure the first collector terminal 122 to the first terminal plate 123.

A connecting portion 122c may be formed by welding at a boundary upwardly exposed when the rivet portion 122b comes into contact with the first terminal plate 123. In other words, once the rivet portion 122b is in the expanded position, such that the peripheral wall abuts the sloping surface 123a of the first terminal plate 123, the upper edge 122g of the peripheral wall may be welded or otherwise attached to the first terminal plate 123, to form the connecting portion 122c (see FIG. 8). The connecting portion 122c may fixedly or securely connect the rivet portion 122b and the first terminal plate 123 to each other. In addition, the terminal portion 122d of the first collector terminal 122 may protrude upwardly or extend above the rivet portion 122b, forming a terminal end of the secondary battery 100. An upper diameter of the collector terminal 122 may be smaller than a lower diameter of the collector terminal 122 when the rivet portion is in the upright position. In a case where a plurality of secondary batteries 100 are required to be connected to each other in series/parallel, the terminal portion 122d may further include threads formed on its outer circumferential surface for bolt engagement with a bus bar.

Here, the first collector terminal 122 may be electrically insulated from the cap plate 151. The first collector terminal 122 may be made of, for example, copper, a copper alloy, a combination of copper and a copper alloy, or equivalents thereof. It should be understood that the material from which the first collector terminal 122 may be formed is not limited to the materials specifically described herein.

The first terminal plate 123 may include the sloping surface 123a recessed from a top surface of the first terminal plate 123. For example, the sloping surface 123a may extend below a horizontal top surface 123c of the first terminal plate 123. The sloping surface 123a may extend below a horizontal top surface of the terminal plate. The sloping surface 123a may allow the rivet portion 122b of the first collector terminal 122 to be easily compressed and deformed along the surface of the first terminal plate 123 when the rivet portion 122b of the first collector terminal 122 is riveted. For example, when the rivet portion 122b is in the expanded position, the sloping surface 123a may contact and support the peripheral wall of the rivet portion 122b. In addition, as described above, the first terminal plate 123 and the rivet portion 122b of the first collector terminal 122 may be connected or secured to each other by the connecting portion 122c. Therefore, the first terminal plate 123 and the first collector terminal 122 may be mechanically and electrically connected to each other. The first terminal plate 123, like the first collector terminal 122, may be made of copper, a copper alloy, a combination of copper and a copper alloy, or equivalents thereof. It should be understood that the material from which the first terminal plate 123 may be formed is not limited to the materials specifically described herein.

Alternatively, the first terminal plate 123 may be formed of two layers made of different metals, including a lower layer made of copper and an upper layer made of aluminum.

The second terminal 130 may also be made of a metal or equivalents thereof and is electrically connected to the second electrode plate 112. The second terminal 130 may include a second collector plate 131, a second collector terminal 132, and a second terminal plate 133. The second terminal 130 may have the same shape as the first terminal 120, and a detailed description thereof will be omitted. The second collector plate 131 and the second current collector terminal 132 may be generally made of aluminum, an aluminum alloy, a combination of aluminum and an aluminum alloy, or equivalents thereof. It should be understood that the materials from which the second collector plate 131 and the second current collector terminal 132 may be formed are not limited to the materials specifically described herein.

In addition, the second collector terminal 132 may have a flange 132a provided at its lower portion, to be fixed to the bottom portion of the cap plate 151. The second collector terminal 132 may be coupled to a sloping surface 133a of the second terminal plate 133 by a rivet portion 132b formed at or near a top portion of the second collector terminal 132. An end portion of the second collector terminal 132 may be secured within a terminal hole 131a in an upper portion of the second collector plate 131. The rivet portion 132b may be between the flange 132a and a terminal portion 132d, and may be affixed to the terminal plate 133. A connecting portion 133c may be formed by welding at a boundary upwardly exposed when the rivet portion 132b comes into contact with the first terminal plate. The second collector terminal 132 may be mechanically and electrically connected to the second terminal plate 133 through a connecting portion 132c formed at an upper edge of the rivet portion 132b and the second terminal plate 133. In addition, the second terminal plate 133 may be made of stainless steel, aluminum, an aluminum alloy, copper, a copper alloy, or combinations thereof. It should be understood that the materials from which the second terminal plate 133 may be formed are not limited to the materials specifically described herein.

In some embodiments, the second terminal plate 133 may be electrically connected to the cap plate 151. In some embodiments, the case 140 and the cap plate 151 may have the same polarity (e.g., a positive polarity) as the second terminal 130.

The case 140 may be made of a conductive metal, such as aluminum, an aluminum alloy, or nickel plated steel. The case 140 may be formed, e.g., in a rectangular box shape and have an upper opening through which the electrode assembly 110, the first terminal 120, and the second terminal 130, may be inserted and placed in the case. Although the upper opening is not illustrated in FIG. 2 because the case 140 and the cap assembly 150 are in an assembled state, the peripheral portion or outer edges of the cap assembly 150 may substantially correspond to the upper opening of the case 140. For example, the upper opening may substantially correspond in shape to the peripheral portion or outer edges of the cap assembly.

The interior surface of the case 140 may be insulated, so that the case 140 is electrically insulated from the electrode assembly 110, the first terminal 120, the second terminal 130, and the cap assembly 150. According to an embodiment, when the first terminal 120 or the second terminal 130 is electrically connected to the cap plate 151, the case 140 may have the same polarity as the cap plate 150.

The cap assembly 150 may be coupled to the case 140. Specifically, the cap assembly 150 may include a cap plate 151, a seal gasket 152, a plug 153, a safety vent 154, a first insulation member 155, and a second insulation member 156.

The cap plate 151 may seal an opening of the case 140 and may be made of the same material as the case 140. In an exemplary embodiment, the cap plate 151 may be coupled to the case 140 by laser welding. As described above, since the cap plate 151 may be electrically connected to the second terminal 130, the cap plate 151 and the case 140 may have the same polarity.

The seal gasket 152 may be formed of an insulating material between the first collector terminal 122 and the cap plate 151 and between the second collector terminal 132 and the cap plate 151 to seal portions therebetween. The seal gasket 152 may prevent external moisture from permeating into the secondary battery 100 or prevent the electrolyte accommodated in the secondary battery 100 from being effused outside or escaping from the secondary battery 100.

The plug 153 may seal an electrolyte injection hole 151a of the cap plate 151, and the safety vent 154 may be installed in a vent hole 151b of the cap plate 151 and may include a notch 154a to be opened at a predetermined pressure.

The first insulation member 155 may be formed between the first terminal plate 123 and the cap plate 151, and between the second terminal plate 133 and the cap plate 151. The first insulation member 155 may closely contact the cap plate 151. The first insulation member 155 may also closely contact the seal gasket 152. The first insulation member 155 may insulate the first terminal plate 123 and the second terminal plate 133 from the cap plate 151. Alternatively, in an embodiment in which the first insulation member 155 or the second insulation member 156 is not formed or provided, the first terminal plate 123 or the second terminal plate 133 may be electrically connected to the cap plate 151.

The second insulation member 156 may be formed between the first collector plate 121 and the cap plate 151, and between the second collector plate 131 and the cap plate 151. The second insulation member 156 may prevent unnecessary electric shorts from being generated. That is to say, the second insulation member 156 may prevent unnecessary electric shorts from being generated between the first collector plate 121 and the cap plate 151 and between the second collector plate 131 and the cap plate 151. In addition, the second insulation member 156 may also be formed between each of the first collector terminal 122 and the cap plate 151, and between the second collector terminal 132 and the cap plate 151, to prevent electric shorts from being generated between the first collector terminal 122 and the cap plate 151, and between the second collector terminal 132 and the cap plate 151.

As described above, according to embodiments, the electrode terminals 120 and 130 of the secondary battery 100 may be configured by, for example, simply connecting components, including, collector terminals 122 and 132 and the terminal plates 123 and 133, to improve assembling efficiency, while reducing the number of components. In addition, since the collector terminals 122 and 132 and the terminal plates 123 and 133 may have simplified configurations, mechanical and electrical reliability can be secured or further improved.

Hereinafter, an assembling method of the secondary battery according to embodiments will be described.

FIGS. 4 to 8 are diagrams illustrating an assembling method of the secondary battery shown in FIG. 1.

In the secondary battery 100, according to embodiments, the first terminal 120 and the second terminal 130 may have the same configuration. As such, the following description will focus on the first terminal 120.

Figure 4:
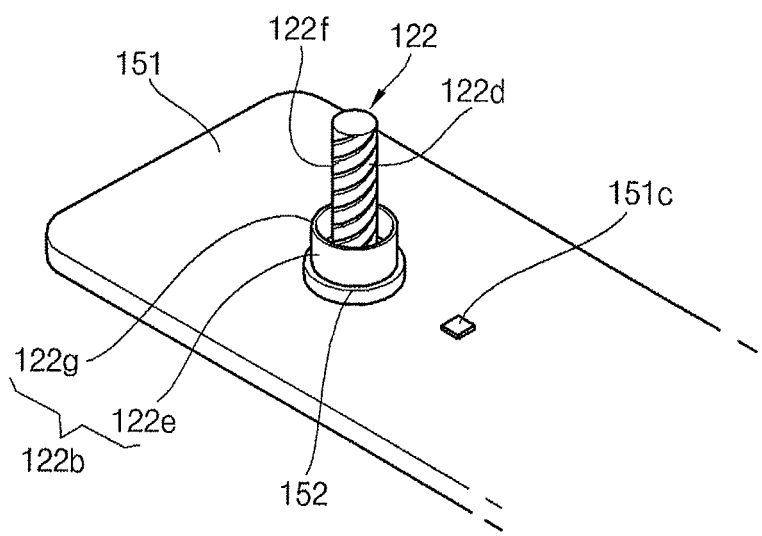
FIGS. 4 to 8 illustrate diagrams of stages in an assembling method of the secondary battery shown in FIG. 1.

Referring to FIG. 4, in the secondary battery 100, according to an embodiment, the first collector terminal 122 may first be coupled to the cap plate 151. According to an embodiment, the rivet portion 122b of the first collector terminal 122 may be substantially perpendicular to the top surface of the cap plate 151, and may protrude upwardly from the cap plate 151 together with the terminal portion 122d. Here, the first collector terminal 122 and the rivet portion 122b may be electrically disconnected from the cap plate 151 by the seal gasket 152. A protrusion 151c may be formed on or disposed on the surface of the cap plate 151. The protrusion 151c may, according to an embodiment, be engaged with a groove 155b formed at a corresponding position in a bottom surface of the first insulation member 155.

Figure 5:
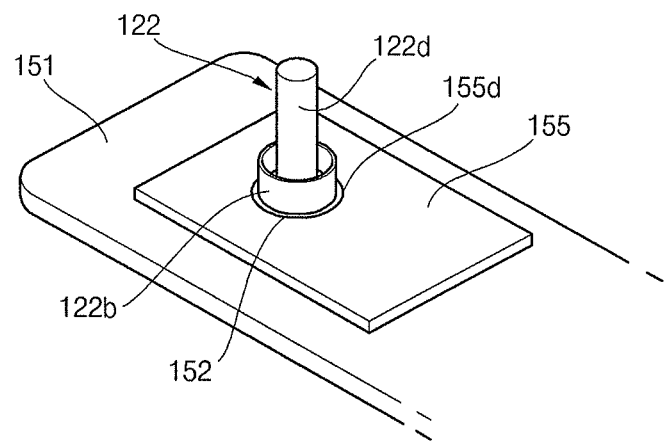

Referring to FIG. 5, the first insulation member 155 may be coupled to the first collector terminal 122. A throughhole 155d may be formed in the first insulation member 155, and the first collector terminal 122 may penetrate or extend through the throughhole 155d and connect with the first insulation member 155.

The first insulation member 155 may be placed on the cap plate 151 and coupled to the protrusion 151c of the cap plate 151. The first insulation member 155 may, thereby, be prevented from rotating about the first collector terminal 122. In addition, the first collector terminal 122 may penetrate or extend through the first insulation member 155 and extend above the first insulation member 155 by a predetermined length.

Figure 6:
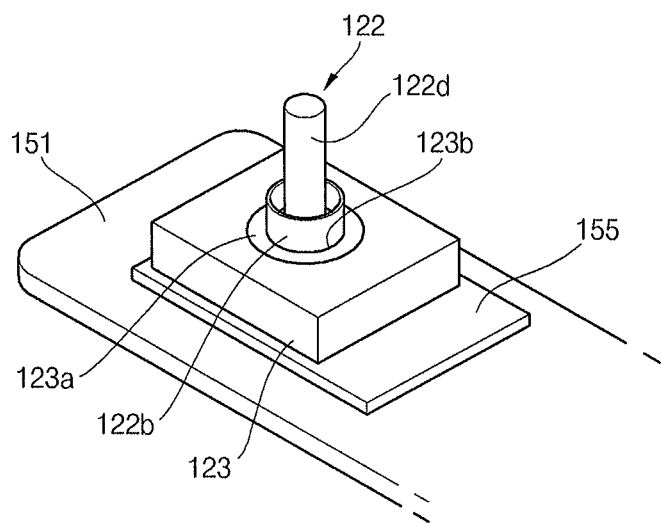

Referring to FIG. 6, the first terminal plate 123 may be coupled to the first collector terminal 122. In other words, the first terminal plate 123 may have a throughhole 123b formed therethrough, e.g., substantially at a center of the first terminal plate 123. The first collector terminal 122 may penetrate or extend through the throughhole 123b and be coupled with or contact the first terminal plate 123. The first terminal plate 123 may closely contact the first insulation member 155. Therefore, the first terminal plate 123 and the cap plate 151 may, thereby, be electrically insulated.

Figure 7:
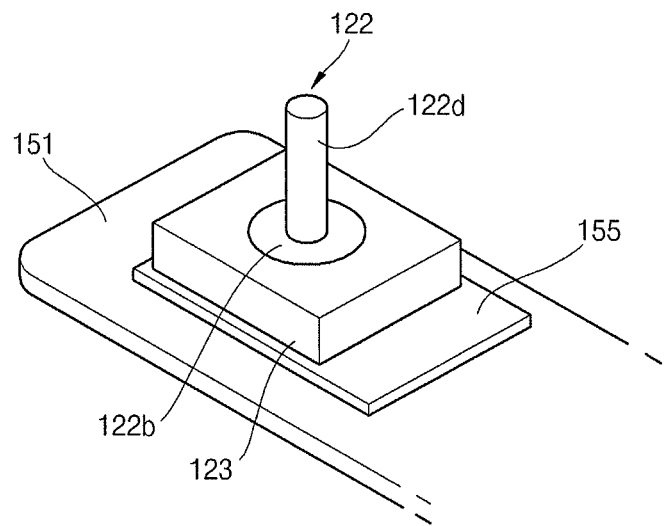

Referring to FIG. 7, the rivet portion 122b of the first collector terminal 122 is shown in a riveted or expanded position. The rivet portion 122b may be riveted or expanded by a riveting tool, to abut the sloping surface 123a of the first terminal plate 123. The rivet portion 122b may be riveted along the sloping surface 123a of the first terminal plate 123, e.g., surround the first collector terminal 122 and overlap the sloping surface 123a. Therefore, the rivet portion 122b may be formed or contained within a space formed by the sloping surface 123 of the first terminal plate 123. In this manner, the rivet portion 122b of the first collector terminal 122 may be tightly fixed to the first terminal plate 123 both electrically and mechanically.

Figure 8:
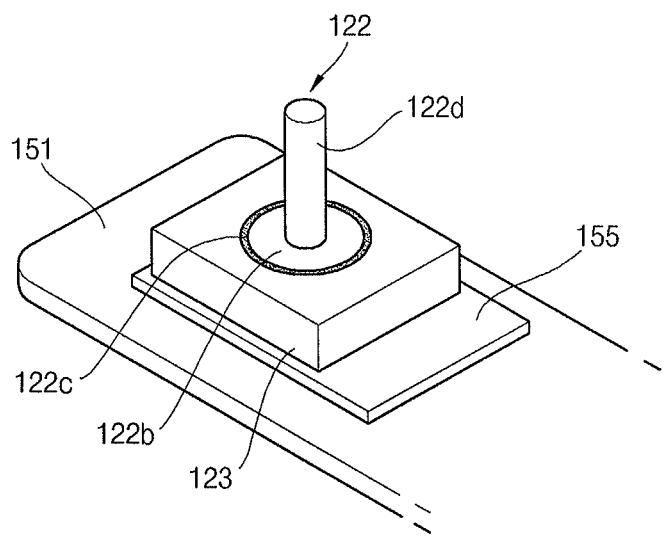

Referring to FIG. 8, welding may be performed along the boundary between the rivet portion 122b of the first collector terminal 122 and the first terminal plate 123, thereby forming the connecting portion 122c. For example, an upper edge 122g of the rivet portion 122b may be welded or otherwise attached to the first terminal plate 123, to form connecting portion 122c and further secure the first collector terminal 122 to the first terminal plate 123. The boundary between the rivet portion 122b of the first collector terminal 122 and the first terminal plate 123 may be, e.g., circularly shaped, as the result of riveting. In one or more embodiments, the welding may be performed along the boundary using circumferential welding. The welded edge portion or connecting portion 122c formed as the result of the welding, may allow the rivet portion 122b and the first terminal plate 123 to be mechanically and electrically coupled to each other in a more secure manner. As a result, the first collector terminal 122 and the rivet portion 122b may be stably coupled to the first terminal plate 123.

Although not separately shown, riveting and welding may be performed between the second collector terminal 132 and the second terminal plate 133, thereby allowing the second collector terminal 132 and the second terminal plate 133 to be coupled to each other in a more secure manner. The cap plate 151 may then be coupled to the case 140 by welding. An electrolyte may be injected into the case 140 through the electrolyte injection hole 151a of the cap plate 151. Then, the electrolyte injection hole 151a may be plugged by the plug 153.

Embodiments may provide a secondary battery that can be manufactured using a simplified process. The secondary battery may have an improved electrode terminal that is mechanically and electrically reliable.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
   a case including an upper opening and an internal cavity;
   an electrode assembly disposed within the internal cavity of the case;
   a cap plate coupled to the case and sealing the upper opening;
   a collector plate coupled to the electrode assembly;
   a collector terminal coupled to the collector plate, the collector terminal including a rivet portion and a terminal portion, the rivet portion and the terminal portion being located above a top surface of the cap plate, the terminal portion including a threaded outer surface, the threaded outer surface having a diameter that is less than a diameter of an outermost surface of the rivet portion; and
   a terminal plate positioned above the cap plate and coupled to the rivet portion of the collector terminal,
   wherein the rivet portion includes a deformable peripheral wall that is adjustable from an upright position to an expanded position, the peripheral wall being spaced from a sloping surface of the terminal plate in the upright position, and the peripheral wall contacting the sloping surface of the terminal plate in the expanded position.

2. The secondary battery as claimed in claim 1, wherein an upper edge of the peripheral wall is directly connected to a contact surface of the terminal plate.

3. The secondary battery as claimed in claim 1, wherein the rivet portion of the collector terminal includes a first region of the collector terminal protruding upward from the terminal plate, the first region being radially folded toward the terminal plate.

4. The secondary battery as claimed in claim 1, wherein the rivet portion of the collector terminal is integral with the collector terminal and the peripheral wall has a funnel shape when adjusted to the expanded position.

5. The secondary battery as claimed in claim 4, wherein the terminal plate includes a sloping surface, the sloping surface extending below a horizontal top surface of the terminal plate, the sloping surface corresponding to the funnel shape of the peripheral wall in the expanded position.

6. The secondary battery as claimed in claim 5, wherein the sloping surface is configured to contact the peripheral wall when the peripheral wall is in the expanded position.

7. The secondary battery as claimed in claim 5, wherein the peripheral wall in the expanded position is directly connected to the sloping surface of the terminal plate.

8. The secondary battery as claimed in claim 1, further comprising a first insulation member between a top portion of the cap plate and the terminal plate.

9. The secondary battery as claimed in claim 1, further comprising a second insulation member between a bottom portion of the cap plate and a flange of the collector terminal.

10. The secondary battery as claimed in claim 1, further comprising a seal gasket disposed around a throughhole of the cap plate through which the collector terminal extends.

11. The secondary battery as claimed in claim 9, wherein the flange extends parallel to the cap plate.

12. The secondary battery as claimed in claim 1, wherein the rivet portion is between the terminal plate and the terminal portion.

13. The secondary battery as claimed in claim 1, wherein the rivet portion surrounds the terminal portion and overlaps the terminal plate.

14. A secondary battery, comprising:
    a case including an upper opening and an internal cavity;
    an electrode assembly disposed within the internal cavity of the case;
    a cap plate coupled to the case and sealing the upper opening;
    a collector plate coupled to the electrode assembly;
    a collector terminal coupled to the collector plate, the collector terminal including a rivet portion and a terminal portion, the rivet portion and the terminal portion being located above a top surface of the cap plate, the terminal portion including a threaded outer surface, the threaded outer surface having a diameter that is less than a diameter of an outermost surface of the rivet portion; and
    a terminal plate positioned above the cap plate and coupled to the rivet portion of the collector terminal, wherein the rivet portion extends at an oblique angle from the terminal portion to contact a sloping surface of the terminal plate.

15. The secondary battery as claimed in claim 1, wherein:
    a connecting portion is located at a boundary between the rivet portion of the collector terminal and the terminal plate, and
    the connecting portion is welded such that the connecting portion mechanically and electrically connects the collector terminal and the terminal plate.

16. The secondary battery as claimed in claim 1, wherein the peripheral wall in the upright position is in the form of a hollow cylinder that encloses a space, the terminal portion being located in the space.

* * * * *